United States Patent [19]

Siu

[11] Patent Number: 4,835,430
[45] Date of Patent: May 30, 1989

[54] COMMUTATOR CONNECTION IN AN ELECTRIC MOTOR

[75] Inventor: Siu-Kwan Siu, Aberdeen, Hong Kong

[73] Assignee: Johnson Electric Industrial Manufactory, Limited, Chaiwan, Hong Kong

[21] Appl. No.: 146,581

[22] Filed: Jan. 21, 1988

[30] Foreign Application Priority Data

Jan. 21, 1987 [GB] United Kingdom ............... 8701260

[51] Int. Cl.⁴ ............................................ H01R 39/32
[52] U.S. Cl. ..................................... 310/234; 29/597; 310/42; 439/880
[58] Field of Search ................ 29/597; 310/71, 233, 310/234, 42, 236; 439/877, 878, 879, 880, 881, 882

[56] References Cited

U.S. PATENT DOCUMENTS

| | | | |
|---|---|---|---|
| 3,061,749 | 10/1962 | Hohler | 310/234 |
| 3,421,212 | 1/1969 | Chabot | 310/234 |
| 4,437,230 | 3/1984 | Greutmann | |
| 4,501,983 | 2/1985 | Schmider | 310/68 R |
| 4,736,780 | 4/1988 | Matsuo | 221/12 |

FOREIGN PATENT DOCUMENTS

| | | |
|---|---|---|
| 439099 | of 1940 | Belgium . |
| 8318894 | 5/1985 | France . |
| 2134324 | 8/1984 | United Kingdom . |

*Primary Examiner*—Peter S. Wong
*Assistant Examiner*—D. L. Rebsch
*Attorney, Agent, or Firm*—Fleit, Jacobson, Cohn & Price

[57] ABSTRACT

In a fractional horsepower DC motor, wire of an armature coil is connected to a commutator segment by hot forging a tang of the segment onto the wire to grip it. A piece of solder is positioned adjacent the wire and tang during forging to coat the wire during forging and fill in cavities between the wire and tang, thus enhancing the electrical and mechanical connection.

5 Claims, 1 Drawing Sheet

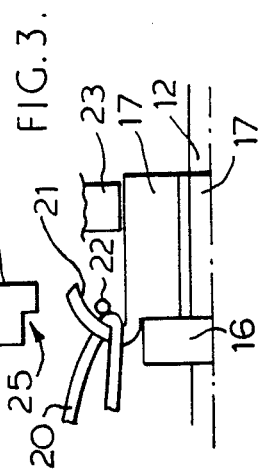
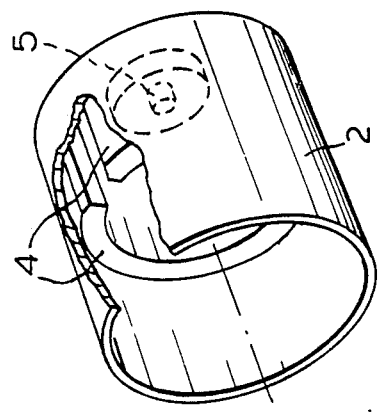
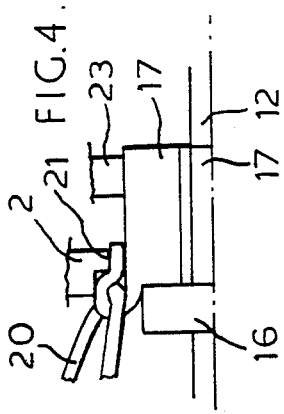
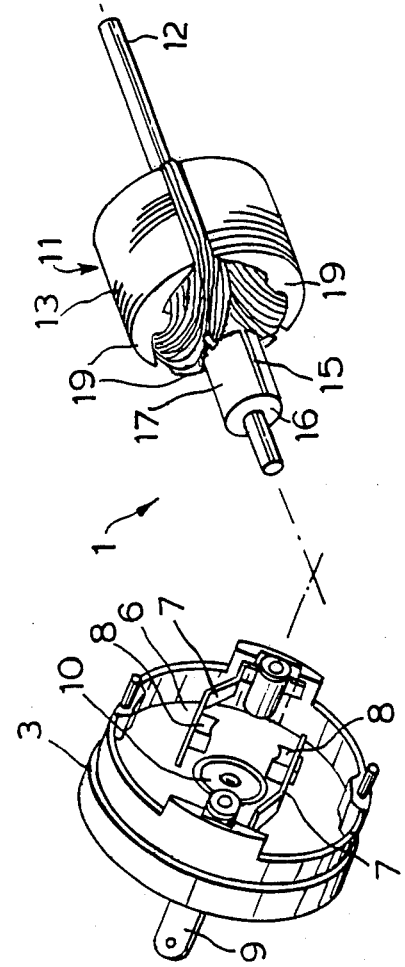
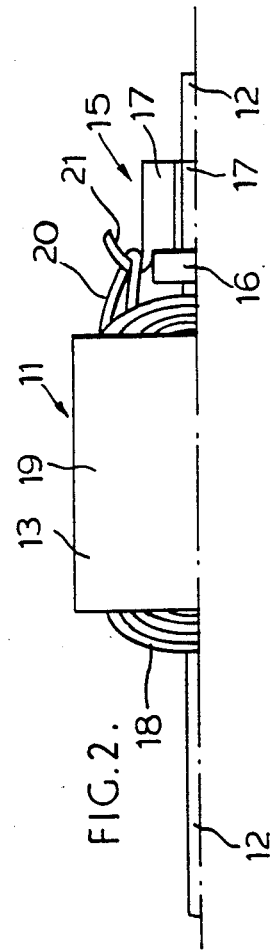

COMMUTATOR CONNECTION IN AN ELECTRIC MOTOR

INTRODUCTION

The present invention relates to a method of electrically connecting a commutator segment to the wire of a wound armature coil in a fractional horsepower DC motor.

BACKGROUND

Connections between the commutator segments and the armature coil wire have been made using a hot forging process. A tang is provided on the commutator segment and is bent over to enclose or trap the wire. An electrode is brought down onto the tang to bend it over against the commutator segment, trapping the wire in between. Another electrode bears on the segment and a current is passed between the electrodes to heat the tang, the pressure and heat serving to forge a free end of the tang onto the segment to form a sticking contact between the tang end and the segment. Insulating resin coating on the wire is burnt off during the hot forging process so that there is electrical contact between the wire and the commutator segment and tang. In fractional horsepower motors of this type it is important that the electrical resistance of the motor, and hence of any electrical connections in the motor, be kept to a minimum. When using the hot forging process with large diameter wires it is found that, in use, the resistance of the wire-segment connection may increase to an unacceptable level. Although the large diameter wire is trapped by the tang, it tends to flex and move due to the centrifugal forces on it and differential expansion as the motor heats up and cools down, resulting in a loose mechanical connection and hence a poor electrical connection.

It is known to pre-tin the segments of the commutator before hot forging. The reasons for doing this are not clear but it does not result in a significant improvement in connections with large diameter wires and it is necessary to remove the tinning from brush contacting surface of the segments before the commutator is used.

SUMMARY OF THE INVENTION

A first aspect of the invention provides a fractional horsepower DC electric motor having a housing, a stator and brushgear mounted in the housing, a rotor rotatably mounted in the housing and comprising a shaft, and a wound armature coil and a commutator mounted fast on the shaft, the commutator comprising segments on an insulating base, each segment having a tang, wherein a wire of the armature coil has been connected to a commutator segment by a hot forging process in which a piece of soler is positioned adjacent the tang and the wire during forging such that a layer of solder is formed around the wire in the finished connection, the solder filling at least some cavities which may be formed between the wire and tang.

A second aspect of the present invention provides a method of electrically connecting a commutator segment to wire of a wound armature coil in a fractional horsepower DC electric motor, the method comprising hot forging a tang of the commutator segment around the wire to grip it, wherein a piece of solder material is positioned adjacent the tang and the wire, the solder being melted during the forging process to coat the portion of the wire in contact with the tang and to fill in at least some of the cavities which may be formed between the wire and the tang.

The invention is particularly applicable to cases where the gauge of the wire is large relative to the size of the commutator segment tang.

Other preferred features and advantages of the invention will be apparent from the following description and the accompanying claims.

BRIEF DESCRIPTION OF THE DRAWINGS

FIG. 1 is an exploded perspective view of a fractional horsepower permanent magnet direct current (PMDC) motor embodying the invention;

FIG. 2 is a part side view of an armature of the motor of FIG. 1, prior to hot-forging a connection between wire of the armature coil and a commutator segment, FIGS. 3 and 4 are enlarged part views taken from FIG. 2 and showing steps of the hot forging process.

FIG. 1 is an exploded perspective view of a fractional horsepower PMDC motor having a construction which is generally well known in the art and need be described only briefly here.

DESCRIPTION OF THE PREFERRED EMBODIMENT

The motor 1 has a housing comprising a deep drawn can-like steel casing 2 and a plastic end cap 3. The casing 2 carries two permanent magnets 4 and a bearing 5. The end cap 3 carries brushgear 6 in the form of resilient brushleaves 7 carrying brushes 8 at one end and mounted at their other ends in the end cap 3. Motor terminals 9 extend from the brushleaves 7 through the end cap 3 for connection to a power supply, not shown. A second bearing 10 is mounted in the end cap 3. A rotor 11 of the motor comprises a shaft 12 which is journalled in the bearings 5, 10 and carries a wound armature 13 and a commutator 15. The commutator 15 is of the assembled type and comprises a plastic base 16 on which conducting copper segments 17 are mounted. Such assembled commutators are well known in the art.

FIG. 2 is a schematic side view showing an upper half of the rotor 11 of the motor 1.

The commutator illustrated comprises segments 17 which are fast on a cylindrical base 16, each segment 17 extending for slightly less than 120 degrees around the shaft 12. The armature 13 comprises three coils of insulating resin coated wire, each coil 18 being wound on a respective shaped arm 19 (when seen in radial cross-section) of a support which is fast on the shaft 12. Electrical connection between a coil 18 and a respective pair of commutator segments 17 is made by looping a turn of the wire 20 around a tang 21, integrally formed at the adjacent end of the segment 17, when the wire passes from one coil to another. At the start and finish of winding the coils the ends of the wire are looped past a common tang which will serve to hold the ends fast.

To secure the wire 20 in mechanical and electrical connection with the segments 17 the tang 21 is bent over using a hot forging process which per se is well known in the art. Referring to FIG. 2 a piece of solder wire 22 is placed beneath the tang 21 adjacent the wire 20. Conveniently a length of solder wire is held with a free end beneath the tang 21 adjacent the wire 20.

The connection is then formed by hot forging. FIG. 2 illustrates a hot forging process which is used in the art. The rotor is supported in a nest or the like (not shown) with the tang 21 to be forged uppermost. A first (positive) electrode, illustrated schematically at 23, contacts the segment 17. A second (negative) electrode, illustrated schematically at 24, having a stepped lower surface 25 is brought down on to the tang 21 to press it against the respective segment 17 (FIG. 3) and trap the wire 20, squeezing the wire slightly. A voltage is applied to the electrodes 23, 24 to pass a current through the tang 21 and the segment 17 thus heating the tang and the adjacent portion of the wire 20. The heat generated is sufficient to burn off the insultating coating on the wire to allow electrical contact between the wire 20 and the tang and adjacent region of the segment 17. At the same time, the solder 22 melts and flows around the circumference of the wire 20, in the region where it is gripped by the hot tang 21. In addition to forming an intimate electrical contact between the wire 20 and the tang 21, the solder has been found to fill any voids between the wire and the tang, thus forming a more secure mechanical connection which resists movement of the wire relative to the tang. To forge the remaining wire-segment connections the assembly is rotated about the axis of shaft 12 to bring the respective tangs uppermost.

It has been found that this process, utilising a piece of solder 22 provides a more reliable low resistance electrical connection between the commutator segment and wire, in particular by making a more secure mechanical joint which retains its low resistance during the effective lifetime of the motor.

The invention is applicable to the various types and designs of commutator where hot forging is used to connect the wire to the commutator segment. In such designs the tang may be folded on itself to grip the wire or against the segment proper in the plane of the brush contacting surface of the segment.

Various modifications may be made to the process and product of the invention and it is desired to include all such modifications as fall within the scope of the accompanying claims.

What is claimed is:

1. A fractional horsepower DC electric motor having a housing, a stator and brushgear mounted in the housing, a rotor rotatably mounted in the housing and comprising a shaft, and a wound armature coil and a commutator mounted fast on the shaft, the commutator comprising segments on an insulating base, each segment having a tang, wherein a wire of the armature coil has been connected to a commutator segment by a hot forging process in which a piece of solder is positioned adjacent the tang and the wire during forging such that a layer of solder is formed around the wire in the finished connection, the solder filling at least some cavities which may be formed between the wire and tang.

2. An electric motor as claimed in claim 1, in which the solder coating extends fully around the circumference of the wire in the region of the tang.

3. An electric motor as claimed in claim 1, wherein the commutator is an assembled commutator comprising a plurality of commutator segments assembled onto a plastic base.

4. An electric motor as claimed in claim 1 wherein the housing comprises a can-like deep drawn steel casing, and the stator comprises permanent magnets mounted in the casing.

5. A fractional horsepower DC electric motor having a housing, a stator and brushgear mounted in the housing, a rotor rotatably mounted in the housing and comprising a shaft, and a wound armature coil and a commutator mounted fast on the shaft, the commutator comprising segments on an insulation base, each segment having a tang forged around a wire of the armature coil with a layer of solder being provided between the wire and the tang, the solder filling at least some cavities between the wire and the tang.

* * * * *